July 1, 1958        J. J. OLSON        2,840,878
SEPARABLE KEY HOLDER
Filed March 5, 1956
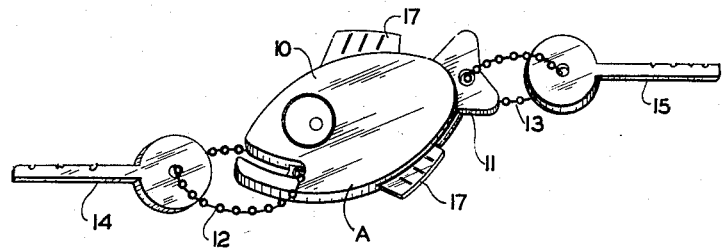
FIG. 1
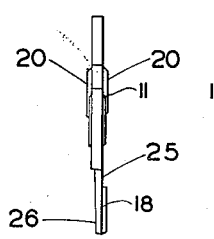 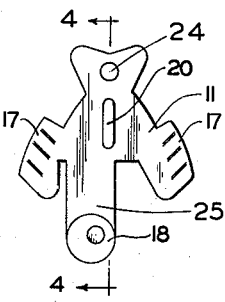 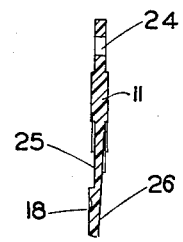 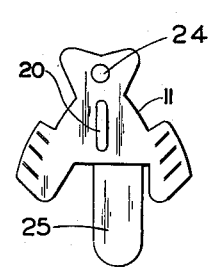
FIG. 2    FIG. 3    FIG. 4    FIG. 5
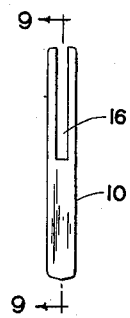 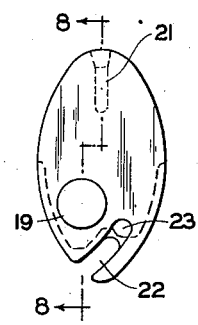 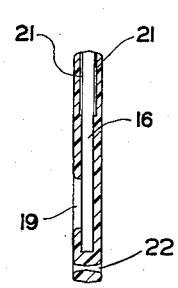 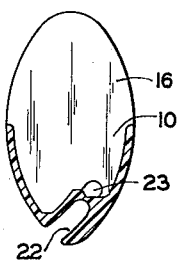
FIG. 6    FIG. 7    FIG. 8    FIG. 9
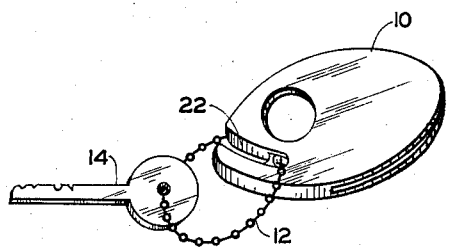 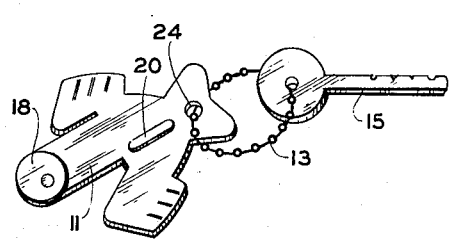
FIG. 10        FIG. 11
*INVENTOR*
JOHN J. OLSON
BY *Thomas L. Pincher*
*ATTORNEY*

United States Patent Office 2,840,878
Patented July 1, 1958

2,840,878
SEPARABLE KEY HOLDER

John J. Olson, St. Paul, Minn., assignor to Brown & Bigelow, St. Paul, Minn., a corporation of Minnesota Application March 5, 1956, Serial No. 569,367

6 Claims. (Cl. 24—230)

This invention relates to a separable key holder with key supporting chains attached to each part. The body of the key holder is formed flat and may be in the form of a fish or other article and is preferably formed of plastic.

A feature resides in providing a key holder having a pair of key chains, each of which is removably attached to a separate part of the plastic body which is made separable so that one key chain can support one set of keys, such as ignition keys for an automobile and the other part may support other keys which may be for other purposes than for use with an automobile. Some vehicles have two sets of keys, one for the ignition of the automobile and the other for the trunk and pocket of the automobile, and it is desirable to separate these respective keys, one from the other, when the car is parked in a public garage or parking lot when the ignition keys are normally left with the automobile.

When the body of the key holder is made in the form or to simulate the form of a fish, the tail and fin portions together with the eye are removable from the main body portion. In this form which simulates a fish, the portion integral with the fins and tail, which indicates the eye, is adapted to provide a locking button which springs into an opening in the body member. The eye portion can be depressed so as to disengage the same with the fins and tail, and the tail portion is provided with a key chain, whereas the body portion is also provided with a key chain which may be placed in line with the mouth of the fish-like body. Thus, I provide an attractive key supporting means for the body which may be made out of plastic, one portion of which may be one color and the other portion of another color with the flexible key chains attached to each portion, thereby providing an attractive key supporting holder.

The foregoing features, together with the other details and objects of the invention, will be more clearly hereinafter set forth.

In the drawings forming part of this specification:

Figure 1 is a perspective view illustrating my key supporting article shown to simulate a fish.

Figure 2 illustrates an edge view of the eye, fins and tail portion removed from the plastic body of the article, the same being also made of plastic.

Figure 3 illustrates a side view of the eye, fins and tail portion of the article removed from the body portion.

Figure 4 is a section on the line 4—4 of Figure 3.

Figure 5 illustrates the other side of the eye, fins and tail portion from that illustrated in Figure 3.

Figure 6 illustrates an edge view of the body portion showing the slot in which the tail and fin portion is adapted to be inserted.

Figure 7 is a side view of the body portion illustrated in Figure 6.

Figure 8 is a section on the line 8—8 of Figure 7.

Figure 9 is a section on the line 9—9 of Figure 6.

Figure 10 illustrates a perspective view of the body portion of the holder separated from the fins and tail portion and showing the key chain depending therefrom.

Figure 11 is a perspective view of the tail, fins and eye portion of the key supporting article with a key chain and key depending therefrom.

The body of the article illustrated in the drawings, which simulates a fish, is made in two parts, each of which are molded from plastic, the main body portion 10 being adapted to receive the tail, fin and eye portion 11. The portion 10 supports a bead key chain 12 while the tail portion 11 supports a key receiving bead chain 13. The drawing illustrates the key 14 on the chain 12 and the key 15 on the chain 13.

Thus, in Figure 1, I have clearly illustrated the article which simulates a fish with the respective bead chains for supporting the keys 14 and 15 respectively.

The body portion 10 is illustrated in Figures 6 to 9 inclusive. Figure 6 shows an edge view with an open slot 16 which is adapted to receive the tail and fin portion 11. The slot 16 extends down into the body portion 10 as illustrated in dotted lines in Figure 7 and in the sectional view, Figure 8, the depth of the slot 16 being clearly indicated.

The body portion 10 is also illustrated in Figure 9 to indicate the depth of the slot 16. This slot 16 provides a means of receiving the flat thin plastic tail portion 11 with the fin portions 17 projecting, as illustrated in Figure 1.

The tail portion 11 is formed with an eye portion 18 which provides a spring member so that the button-like eye portion 18 is adapted to snap into the opening 19 formed in one side of the body 10 as illustrated in Figures 7 and 8. Centrally of the portion 11, I provide ribs 20 which are adapted to guide the tail portion 11 into the slot 16 of the member 10 by engaging with the slots 21 formed on each side of the open slot 16.

The portion 10 is provided with an open slot portion 22 which simulates the mouth of the fish-like article and at the base of the slot 22, the opening 23 is formed in the portion 10 to receive the beaded chain 12.

The tail and fin portion 11 is formed with an opening 24 for receiving the bead chain 13 which supports the key 15. The guiding ribs 20 are formed on either side of the body 11 and thus, the tail and fin portion 11 is readily guided into position when the same is inserted into the slot 16 of the body portion 10 so that the eye portion 18 will snap into the opening 19.

Extending frontwardly from the tail portion 11 is the springable arm 25 having the button-like portion 18 at the outward extremity thereof. The springable arm 25 has a bottom surface 26 which is inclined upwardly toward the side having the button-like eye portion 18 thereon, as illustrated in Figures 2 and 4. Therefore, the extreme end portion of the springable arm 25, exclusive of the eye portion 18 is of lesser depth than the remainder of the arm, and the arm portion 25 increases in depth or cross-section rearwardly. This permits the arm portion 25 to be depressed when the tail portion 11 is fitted within the body portion 10. The natural resiliency of plastic will tend to hold the eye portion 18 in contact with the walls of the aperture 19 when the fin and eye portion 11 is inserted into the body 10. There remains, however, sufficient space beneath the lower surface 26 of the springable arm 25, to permit the edges of the button-like eye portion 18 to be completely disengaged from the walls of the opening 19, thereby permitting the fin and eye portion 11 to be withdrawn out of the slot 16. This feature is important as it obviates the need for other spring means to maintain the button eye 18 in contact with the walls of the opening 19.

When it is desired to separate the two portions 10 and 11, of the article A, the operator presses his finger on the eye portion 18 to release the same from the opening 19 and at the same time pulls on the chain 13 with the portion 10 firmly gripped in the other hand. Thus, the portions 10 and 11 can be readily separated as shown in Figures 10 and 11.

This article may be made in any form or shape desired where the principle of locking the two portions together is virtually the same, as herein described, and where each of the portions support a respective beaded chain 12 and 13 respectively. Therefore, it will be apparent that the key 14 may represent the ignition key of an automobile while the key 15 would simulate the key for the trunk of the automobile or for one's house key.

It will also be apparent that this article is of simple, inexpensive construction, and the body being flat while the portion 11 is also flat, permits the easy and convenient carrying of the same in a small space in the pocket or otherwise. The articles fit together readily when it is desired to carry the same together in a connected form, and may be readily separated whenever it is desired.

While the drawing illustrates a particular form of the invention, I desire to have it understood that the drawing and descriptive matter herein contained are only suggestive of the invention and it should be interpreted within the scope of the following claims.

I claim:

1. A coupling device for supporting a pair of bead chains which in turn are adapted to support keys, including a flat plastic body portion having a slot internally formed therein and having means for supporting a key chain, a plastic insert member separable from said body portion adapted to slide within the same, said insert member having means for supporting a key chain, a springlike extension formed on said insert member to releasably engage said body portion, said body portion having shoulder means for receiving the springlike extension formed on the separable member, and means for guiding said plastic insert member into said slot in the plastic body portion.

2. A plastic article formed to simulate a fish or the like comprising a body portion having a longitudinal internal slot formed therein and a separable member having a spring end with a locking button formed thereon adapted to slide into said slot, said body portion having a hole therein for receiving the button to lock said body portion and said separable member together, said body portion and said separable member each having means for supporting a key chain.

3. A plastic article formed to simulate a fish including a body portion, a fin and tail portion having an eye portion in the form of a spring button integrally formed therewith, said body portion having a slot therein for supporting said fin and tail portion, said body portion further having a hole therein for receiving said eye portion as a locking button for locking the portions together, said portions each having means for supporting a key chain thereby permitting one key chain to be separated from the other key chain by removing said tail and fin portion from said body portion.

4. A separable key holder for independently retaining two sets of keys comprising a flat outer shell having a hole therein for supporting a first key chain, a flat inner member having a hole therein for supporting a second key chain, means within said outer shell for slidably receiving said inner member, springable catch means formed on said inner member cooperable with shoulder means formed on said outer shell to releasably retain said inner member within said outer shell, guide means for positioning said inner member within said outer shell, and stop means for limiting the travel of the inner member within the outer shell.

5. The device of claim 4 wherein said outer shell is shaped to resemble the head and forward portion of a fish, and wherein the shoulder means formed on said outer shell simulates an eye of a fish, and wherein the inner member has an external shape resembling the dorsal, caudal, and ventral fins of a fish, said dorsal and ventral fins cooperating with said outer shell to form said stop means.

6. A detachable keyholder having a fish-like shape comprising a flat forward portion provided with a hole for a key chain and a curved slot to simulate the mouth of a fish, said forward portion formed of two substantially flat members with a slot intermediate said flat members, said forward portion having an aperture simulating the eye of a fish in one surface and parallel guide grooves on the inner surfaces of said flat members, a solid flat rear portion having a circular shaped button on one end biased so as to releasably engage the aperture in said forward portion when said rear portion is slidably received in the slot, said rear portion having upstanding ribs on each side thereof to slideably engage the parallel guide grooves in said forward portion, said rear portion having a simulated ventral and dorsal fin to abuttingly engage the forward portion when said rear portion is slideably engaged within said forward portion, said rear portion having a simulated tail having a hole therein for a key chain.

References Cited in the file of this patent

UNITED STATES PATENTS 2,694,244    Nolan    Nov. 16, 1954
2,702,928    Nielsen    Mar. 1, 1955

OTHER REFERENCES

Page 17, magazine Parade, Jan. 23, 1949, issue of The Washington Post.